US012629305B2

(12) United States Patent
Clarke et al.

(10) Patent No.: US 12,629,305 B2
(45) Date of Patent: May 19, 2026

(54) TRANSFER BOARDS

(71) Applicants: Christine Clarke, Milborne St. Andrew (GB); Bradley Buckingham, Milborne St. Andrew (GB)

(72) Inventors: Christine Clarke, Milborne St. Andrew (GB); Bradley Buckingham, Milborne St. Andrew (GB)

( * ) Notice: Subject to any disclaimer, the term of this patent is extended or adjusted under 35 U.S.C. 154(b) by 0 days.

(21) Appl. No.: 19/352,073

(22) Filed: Oct. 7, 2025

(65) Prior Publication Data

US 2026/0034006 A1 Feb. 5, 2026

Related U.S. Application Data

(63) Continuation of application No. 18/036,490, filed as application No. PCT/GB2021/052919 on Nov. 11, 2021, now Pat. No. 12,447,081.

(30) Foreign Application Priority Data

Nov. 11, 2020 (GB) ..................................... 2017808

(51) Int. Cl.
*A61G 7/10* (2006.01)

(52) U.S. Cl.
CPC ........... *A61G 7/103* (2013.01); *A61G 7/1034* (2013.01); *A61G 7/1059* (2013.01); *A61G 7/1073* (2013.01)

(58) Field of Classification Search
CPC .... A61G 7/103; A61G 7/1034; A61G 7/1038; A61G 7/1059; A61G 7/1073
See application file for complete search history.

(56) References Cited

U.S. PATENT DOCUMENTS

| | | | | | |
|---|---|---|---|---|---|
| 2,624,053 | A * | 1/1953 | Beckwith | A61G 7/1003 | 4/565.1 |
| 4,644,594 | A * | 2/1987 | Johnson | A61G 7/1046 | 5/81.1 HS |
| 4,793,008 | A * | 12/1988 | Johansson | A61G 7/103 | 5/89.1 |
| 4,815,785 | A * | 3/1989 | Goodall | A61G 3/06 | 296/65.13 |
| 4,987,621 | A * | 1/1991 | Brantman | A61G 7/103 | 5/81.1 HS |
| 5,067,188 | A * | 11/1991 | Brantman | A61G 7/103 | 5/81.1 HS |
| D358,790 | S * | 5/1995 | Schuster | D12/128 | |
| 9,015,880 | B1 * | 4/2015 | Cauthen | A61G 7/1038 | 5/83.1 |
| 12,447,081 | B2 | 10/2025 | Clarke et al. | | |
| 2002/0134902 | A1 * | 9/2002 | Cheng | A61G 7/1059 | 5/81.1 HS |

(Continued)

*Primary Examiner* — George Sun
(74) *Attorney, Agent, or Firm* — GrayRobinson, P.A.

(57) ABSTRACT

A transfer board comprises an elongate main body portion; and an enlarged end portion at each end of the main body portion, which end portion extends laterally at each side of the main body portion beyond the width of the main body portion. A seat is mounted on the main body portion for sliding movement along the main body portion: wherein the seat has side portions that engage respective side portions of the main body portion to retain the seat on the main body portion whilst affording said sliding movement along the main body portion.

20 Claims, 7 Drawing Sheets

(56) References Cited

U.S. PATENT DOCUMENTS

| | | | | |
|---|---|---|---|---|
| 2002/0166166 | A1* | 11/2002 | Costonde | A61G 7/1044 4/661 |
| 2002/0185579 | A1* | 12/2002 | Henning | B60P 7/08 248/346.02 |
| 2007/0277318 | A1* | 12/2007 | Rak | A61G 7/103 5/625 |
| 2008/0201842 | A1* | 8/2008 | Quickmire | A61G 7/103 5/81.1 HS |
| 2010/0199423 | A1* | 8/2010 | Kraemer | A61G 7/103 5/81.1 HS |
| 2019/0091088 | A1* | 3/2019 | Emerson | A61G 7/1032 |
| 2019/0142669 | A1* | 5/2019 | Tobias | B32B 3/266 5/81.1 R |

* cited by examiner

Section B-B

TRANSFER BOARDS

CROSS-REFERENCE TO RELATED APPLICATIONS

This is a continuation of U.S. application Ser. No. 18/036,490, filed May 11, 2023, which is the U.S. National Stage application of International Application No. PCT/GB2021/052919, filed Nov. 11, 2021, which claims the benefit of priority from GB 2017808.3, filed Nov. 11, 2020. The entire contents of these prior applications are incorporated by reference herein.

FIELD

This invention pertains generally to the field of transfer boards, and in particular transfer boards for both assisted and independent use.

BACKGROUND

People with mobility issues, such as the elderly and infirm, find it hard to manoeuvre themselves, in a seated position, between surfaces. They find it a challenge to transfer from being sat on a bed, to being seated in a wheelchair, or to being sat on a sofa or armchair. Being transferred between wheelchair and car seat can also be problematic. Carers, when assisting a person, can also find it a challenge supporting the person's bodyweight during the transfer process.

There are a number of variables to take into account with each transfer. These might include the material of the surfaces that they are currently seated on, the material of the surface to which they wish to transfer to, the height of both their existing surface, and the surface they are transferring to, their current state of dress, the strength that they have in their limbs to be able to reach and support the transfer.

Transfer boards are widely used. These bridge the gap between surfaces and allow a person to slide from one surface to another, in a seated position, and carrying little, to no, bodyweight through their legs. They typically comprise a flat, rigid board, made from wood or plastics material. A person, or carer, places one end of the board under their backside or bottom, so that with small movements they can manoeuvre their body to be seated on one end of the board. The other end of the board is placed onto the surface to which they wish to transfer. With small movements, and with or without the assistance of carers, the person can shuffle their backside along the board until they are sat on the other end. By removing the board from under their backside, they now find themselves seated on the surface to which they were hoping to transfer.

However, existing transfer boards can prove extremely difficult for independent use, without the help of carers. Inserting one end of the board into position underneath a person's own backside can require some force and dexterity in the first instance. Then shuffling their body along the board and overcoming friction between board and backside can also be very challenging for some users. If their centre of gravity shifts too much away from the centre of gravity of the board, the board may tip, and one end lift, shifting the patient off balance and may even cause them to fall. Having reached the surface to which they were transferring, they then require further dexterity to remove the end of the board from underneath them. Many of these boards are heavy and rather cumbersome, and therefore it can be challenging to place them somewhere within reach for when they are next required.

Some transfer boards incorporate a sliding seat that runs along track or channel in the surface of the board. Whilst attempting to provide a substantially friction free transfer, these mechanisms present other problems. A person's clothing, or even skin and body parts can interfere with or become caught in the mechanism, causing considerable pain and discomfort. Any loose fabric or material on a surface that they are transferring from or onto can also interfere with the sliding mechanism. Soft surfaces, such as a bed, will compress under the weight of the transfer board and the person, causing bedding or material to rise up the sides, which may again interfere with a sliding seat. It can also prove tricky for the person to manoeuvre themselves onto and off the sliding seat at either end of the transfer. The transfer seat is sometimes noticeably higher, so the user has to elevate themselves to get onto the seat. Due to the additional mechanism and seat, these transfer boards can prove heavy and cumbersome to move about, and often it is not possible for a person to effectuate an independent transfer, still requiring help from carers every time they wish to change surface.

The prior art shows a number of devices which attempt to address these needs in various ways.

U.S. Pat. No. 5,282,284 (Brantman Inc) discloses a sliding transfer device comprising a seat that is adapted to support a human user for movement between one surface, such as a bed, to another surface, such as a wheelchair. The transfer device comprises a lower support plate having a substantially flat top surface and ends adapted to be removably positioned proximate and in contact with the surfaces. The top surface incorporates an open-ended track with removable inserts at the ends, and a seat is slidable within the track. Whilst this device goes some way towards reducing the amount of assistance required in transferring a patient or invalid between proximate locations, and reduces the amount of turning the patient must endure in transferring between these locations, items can easily become caught between slidable seat and top surface.

GB 2 474 690 (Mangar Int Holdings Ltd) discloses a transfer board for transferring a patient comprising a board and a pad. The pad has a projection on its underside that slides within a corresponding groove in the surface of the board. The pad may also be arranged so it can rotate. The groove may have an open end to allow the pad to be removed and it may widen at the ends of the board. Whilst providing some assistance with ensuring a smooth transfer, alleviating some of the friction created between bottom and surface in a typical transfer board arrangement, items can become caught between slidable pad and board, causing much discomfort and may cause a person to become stuck mid transfer.

Preferred embodiments of the present invention aim to provide a board for providing support and stability when transferring between surfaces, that is portable and can be easily lifted and placed into position for use, ideally independently and with minimal to no assistance from carers. Preferred embodiments aim to also provide a board that is shaped for ease of insertion underneath a backside of a user, and the centre of gravity is such that it helps to prevent the board from tipping. Preferred embodiments also aim to provide a board that alleviates friction during the transfer process, whilst preventing body parts, items of clothing and surface furnishings from becoming trapped within any mechanisms.

BRIEF SUMMARY

According to one aspect of the present invention, there is provided a transfer board comprising: an elongate main body portion; and a seat that is mounted on the main body portion for sliding movement along the main body portion: wherein the seat has side portions that engage respective side portions of the main body portion to retain the seat on the main body portion whilst affording said sliding movement along the main body portion.

The seat may comprise any one or more of the following: wood, laminated wood, laminated plywood, plastics, rubber, HDPE and polyoxymethylene.

Preferably, the edges of the seat may be tapered.

The ends of the seat may have curved edges.

Preferably, the end contours of the seat may match the end contours of said main body portion.

The seat may have a central depression on which a user sits in use, to assist positioning of the user on the seat.

The side portions of the seat and the main body portion may be formed with interengaging ribs and grooves that snap engage to retain the seat on the main body portion whilst affording said sliding movement along the main body portion.

According to a further aspect of the present invention, there is provided a transfer board comprising: an elongate main body portion; and an enlarged end portion at each end of the main body portion, which end portion extends laterally at each side of the main body portion beyond the width of the main body portion.

Preferably, each said end portion may comprise a first protrusion extending to one side of the main body portion and a second protrusion extending to the other side of the main body portion.

Preferably, each said second protrusion may extend laterally from said main body portion to a greater extent than each said first protrusion.

Each said first protrusion and/or each said second protrusion may comprise a curved edge.

At each of said end portions, the first and second protrusions may be joined by a curved portion that forms an end of the transfer board.

Preferably, each of said protrusions is resiliently flexible, such that it can flex independently of the main body portion and/or the other protrusions.

The main body portion may comprise any one or more of the following: wood, laminated wood, laminated plywood, plastics, rubber, glass-filled plastic and composite polymer.

In a further embodiment, the transfer board may comprise a respective skirt that extends outwardly at each side of the main body portion at or adjacent its underside and extends along the main body portion.

The transfer board may comprise In-Mould Labelling integrated within the main body portion.

Preferably, the edges at the ends of the main body portion may be tapered.

The main body portion may be substantially rectilinear.

Preferably, said main body portion is provided on its upper surface with a low friction coating.

Preferably, said seat is provided on its upper surface with a high friction coating.

Preferably, said seat is provided on its lower surface with a low friction coating.

Preferably, a design containing graphics and/or text is provided on the upper surface of the main body portion and coated with a transparent, protective coating.

Preferably, a design containing graphics and/or text is provided on the upper surface of the seat and coated with a transparent, protective coating.

Preferably, the or each design and its transparent, protective coating has been applied by an In-Mould Labelling process.

Preferably, the main body portion is provided on its underside with a plurality of reinforcing ribs.

Preferably, said main body portion and/or seat is provided with a coating with antimicrobial properties.

In a further aspect, the invention provides a transfer board comprising:

an elongate main body portion; and a protrusion at one or more end of the main body portion, which protrusion extends laterally at one side of the main body portion beyond the width of the main body portion:

wherein the protrusion is resiliently flexible, such that it can flex with respect to the main body portion.

Such a transfer may comprise a plurality of protrusions as aforesaid.

A transfer board according to either of the two preceding paragraphs may also be in accordance with any of the preceding aspects of the invention.

BRIEF DESCRIPTION OF THE DRAWINGS

For a better understanding of the invention, and to show how embodiments of the same may be carried into effect, reference will now be made, by way of example, to the accompanying diagrammatic drawings, in which.

DETAILED DESCRIPTION

Figure 1A:
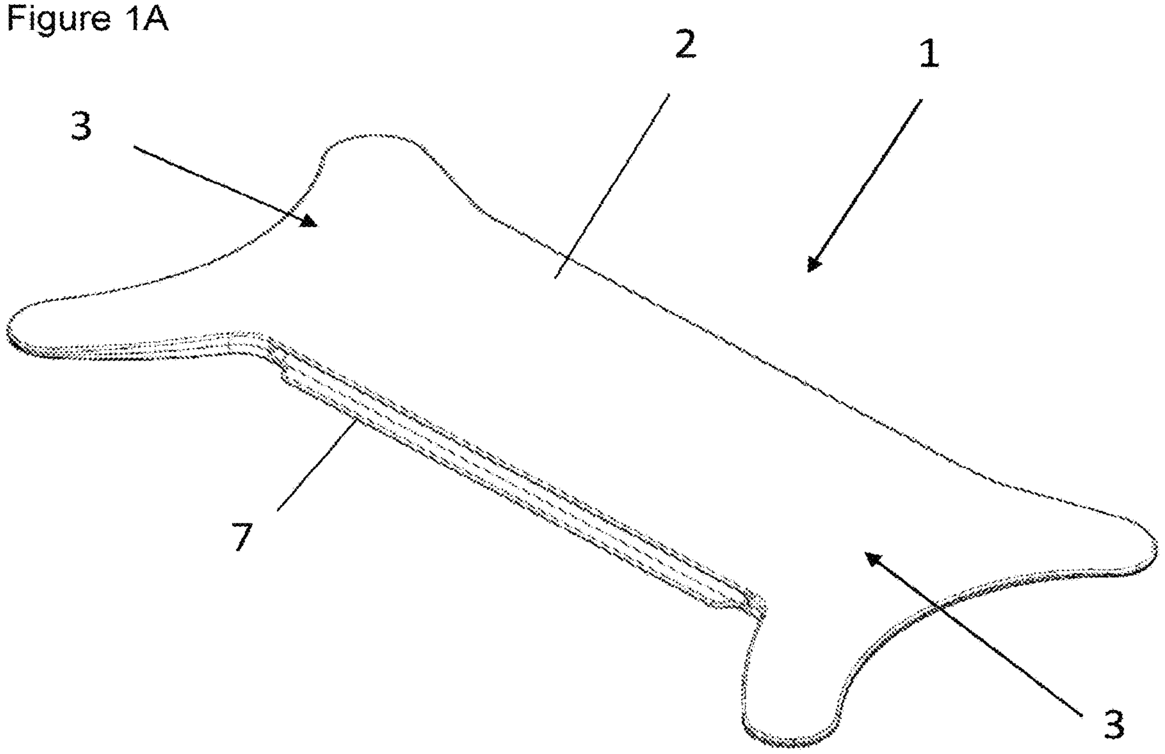
FIG. 1A shows one embodiment of an asymmetrical transfer board in isometric view, with a skirt on the underside.

In the figures like references denote like or corresponding parts.

It is to be understood that the various features that are described in the following and/or illustrated in the drawings are preferred but not essential. Combinations of features described and/or illustrated are not considered to be the only possible combinations. Unless stated to the contrary, individual features may be omitted, varied or combined in different combinations, where practical.

FIG. 1A shows one embodiment of transfer board 1, showing a main body portion 2 that provides a surface along which a person is transferred from one enlarged end portion 3, on one end, to another enlarged end portion 3 on the other end. In use, one of the end portions 3 is inserted underneath a seated person. The person may lie the end portion 3 of the transfer board 1 next to them on the bed, sofa or wherever they are currently sat. They may gently slide the end portion 3 beneath themselves, or wriggle themselves onto the end portion 3, whilst ensuring that the other end portion 3 of the transfer board 1 is placed on a surface to which they wish to transfer. The transfer board 1 bridges the gap between surfaces. The person may have some help from carers to align the transfer board 1 into the right position, but the transfer board 1 has been designed to allow for independent use where possible.

The transfer board 1 is provided with a skirt 7, that runs at least the length of the main body portion 2. The skirt 7 increases the overall width of the main body portion 2, at its base, without increasing significantly the weight of the transfer board 1.

In alternative embodiments, not shown, the skirt 7 may run only a part of the length of the main body portion 2. The purpose of the skirt 7 is to flatten any loose fabric or material on the top of any surface that the person is moving from, or transferring onto. For an example, where the surface is a bed, or cushioned surface such as a sofa or armchair, there may be loose sheets or rugs that the person needs to negotiate when transferring. A cushioned surface causes the transfer board 1 to sink into it. The cushioning, loose sheeting or blankets, or similar items on the surface may be caused to encroach up the sides of the transfer board 1, thereby interfering with the transfer process. The skirt 7 helps to hold some of this material down, or away from the top surface of the transfer board 1, allowing for a smooth transfer.

Figure 1B:
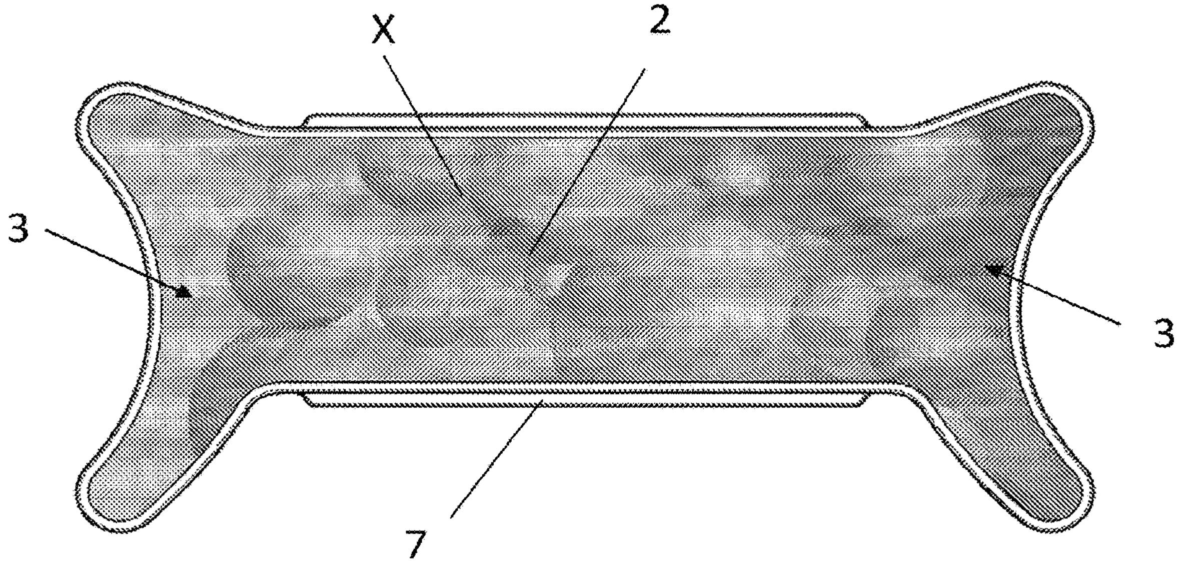
FIG. 1B shows the transfer board of FIG. 1 in top plan view, showing an In-mould design on uppermost surface.

FIG. 1B shows the transfer board 1 with an applied surface design, through In-Mould Labelling, or similar. The graphics on the uppermost surface X of the transfer board 1 personalise the board to an individual or setting and makes the transfer board 1 more attractive to a user. The means of applying the design through In-Mould Labelling processes, ensures that the properties of the uppermost surface X of the transfer board 1 can be maintained. It is important that this uppermost surface X is suitably slippery for ease of transfer of a user. So applying stickers, print, paint or other alternatives to the uppermost surface X, whilst being possible, would likely interfere with the transfer process.

Figure 2:
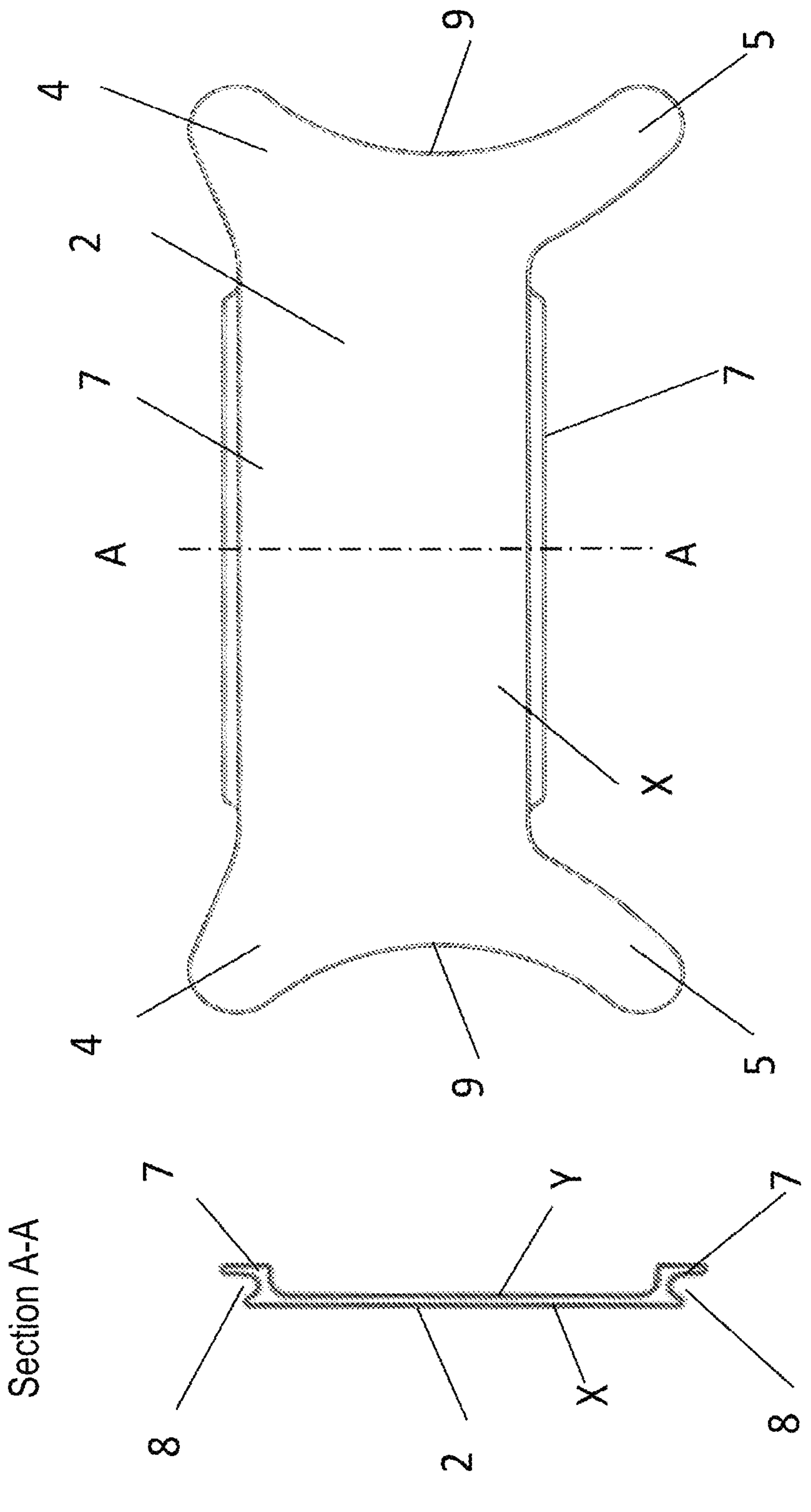
FIG. 2 shows the transfer board of FIG. 1 in top plan view and also showing a section view A-A.

FIG. 2 shows the transfer board 1 in plan view, showing the arrangement of skirt 7 on both sides of the main body portion 2. The skirt 7 creates a groove 8 between main body portion 2 and skirt 7, which can be seen in the section view A:A, that helps to keep the uppermost surface of main body portion 2 clear from any materials interfering with the transfer process. For a smooth transfer, the person needs a clear run from one end portion 3 to the opposite end portion 3. They need to be able to slide their backside along the uppermost surface X of the main body portion 2, without having to negotiate any obstacles along the way. The transfer board 1 may be made from materials that offer as friction free surface as possible. Examples of material include wooden materials such as laminated plywood, and plastics materials, such as glass-filled plastic to provide sufficient strength whilst remaining lightweight. Glass-filled plastic is a mouldable composite material, comprising short glass fibres in a matrix of polymer material. The uppermost surface X may be laminated, treated or coated with such a substance to make the interface between a person's backside, that may or may not be clothed, and transfer board 1, as friction free as possible. A somewhat slippery (low friction) surface makes for a much easier transfer for the person and, where necessary, any carers. The aim is to have the uppermost surface X as smooth and glossy as possible to reduce friction and create a smooth glide. The underside surface Y of the transfer board 1, in contrast, may be provided with a roughened (higher friction) surface texture, so as to prevent slip when placed on a surface such as bedding. This roughened surface may be throughout the underside surface Y of the transfer board 1, or may be in patches or portions of the surface.

Each of the enlarged end portions 3 of the transfer board 1 comprises a first protrusion 4 extending to one side of the main body portion 2 and a second protrusion 5 extending to the other side of the main body portion 2. The protrusions 4 and 5 may be regarded as making up fingers of respective bifurcate ends of the transfer board 1. The transfer board may be regarded as somewhat bone-shaped.

The transfer board 1 is asymmetrical about a longitudinal centre line C (FIG. 9) of the main body part 2. The first protrusions or fingers 4 project to a lesser extent than the second protrusions or fingers 5. The first protrusions or fingers 4 are somewhat wider than the second protrusions or fingers 5. (The protrusions 4 and 5 may be thought of as a fatter and shorter thumb 4 and a thinner and longer finger 5.)

This unique shape of end portion 3 allows for ease of insertion beneath the person, either by themselves, or with the help of carers. The first protrusions 4 and second protrusions 5 help to create curved ends 9 which is where the person transfers on and off the transfer board 1. The second protrusions 5 extend a greater amount due to the fact that typically, the gap created between transfer surfaces, is greater at the front of the transfer board 1 than at the rear. The transfer board 1 is often placed on the diagonal, to negotiate any armrests that may prevent a direct line across. The first protrusions 4 and second protrusions 5 also help to prevent tip during the transfer process. They ensure that the person's weight is transferred onto and off the transfer board 1 gradually. The full weight of the person is not acting on the transfer board 1 until the person has shifted along the transfer board 1 so that their backside is on the main body portion 2, and therefore closer to the centre of gravity of the transfer board 1. The same is true when the person dismounts from the transfer board 1. The bulk of their weight is removed from the board when they reach the curved end 9, and their weight begins to transfer onto the surface. This helps to prevent the user from sitting on one end portion 3 causing the other end portion 3 to lift up, making the transfer board 1 unstable, and may even cause injury to the person or any carers.

The curved ends 9 mean that the carer can present a small portion of the curved end 9 of the transfer board 1 up to the thighs and buttocks of a user, who can shuffle onto the transfer board 1 more easily, transferring their weight from the surface on which they are seated, onto the curved end 9 of the transfer board 1. Unlike existing boards, the user does not have to tilt their pelvis, or tilt to one side, to wedge the board underneath their buttocks. The curved ends 9 ensure ease of insertion of the transfer board 1 underneath a user, and once transferred, extraction of the transfer board 1 from underneath the user.

The section view A-A shows how throughout the main body portion 2, the skirt 7 creates the groove 8, whereby the skirt 7 retains any loose fabric items on the surface, and along with the groove 8 prevents these loose fabric items from interfering with the top surface of the main body portion 2, and therefore the transfer process. Section A-A also shows the uppermost surface X and underside surface Y of the transfer board 1.

Figure 3:
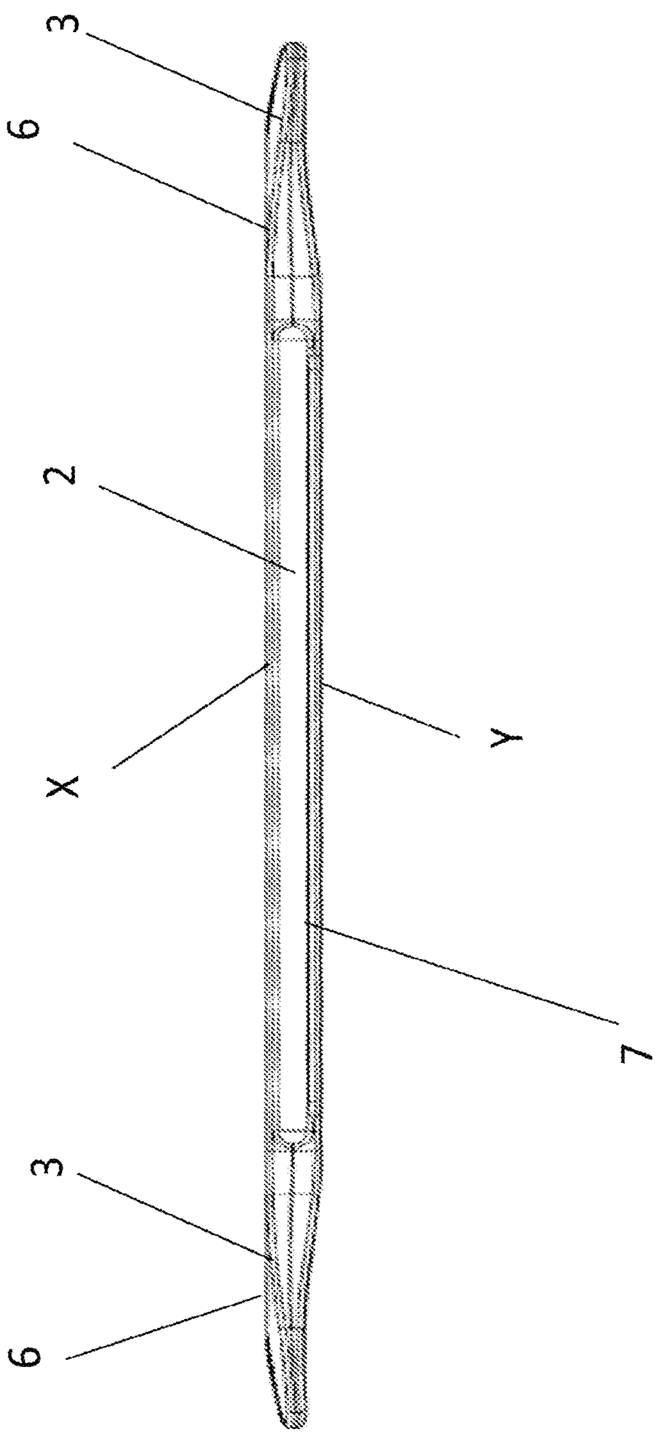
FIG. 3 shows the transfer board of FIGS. 1 and 2, in side view, showing tapering end portions.

FIG. 3 shows a side view of the transfer board 1, showing tapers 6 at each end portion 3. These tapers 6 help to slide the transfer board 1 into position underneath the backside of the person. In this particular embodiment, the first protrusions 4, second protrusions 5 and curved ends 9 are tapered, to create a very thin edge at either end portion 3 of the transfer board 1. FIG. 3 also shows the uppermost surface X and underside surface Y that may be coated, laminated or treated to provide the required properties for an effective transfer. The uppermost surface X should be as friction-free as possible, whilst the underside surface Y should be as non-slippery as possible, so as to grip and maintain the required position when resting on various surfaces.

Figure 4:
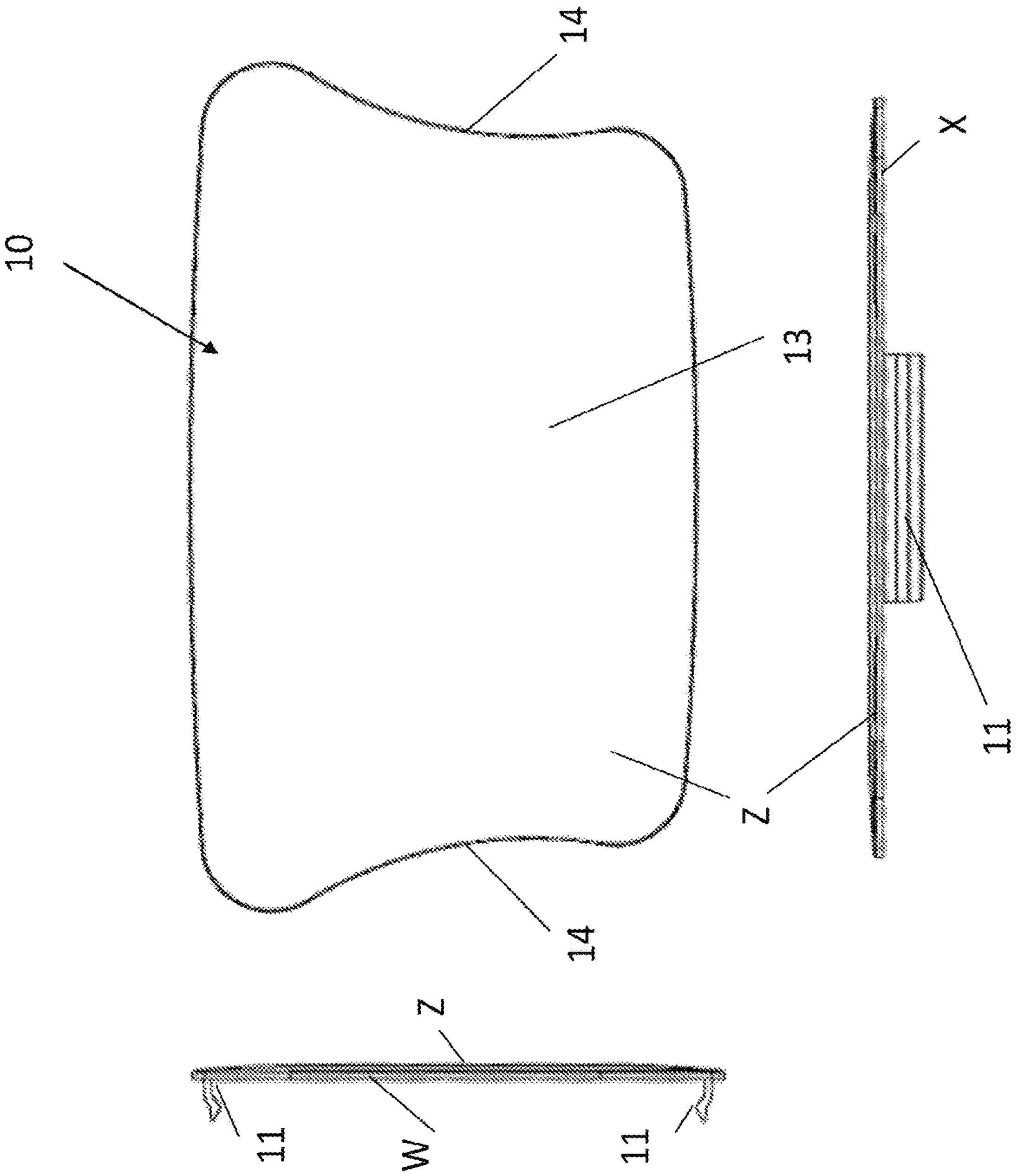
FIG. 4 shows, in top plan, side and end views, a seat for use with the transfer board of FIGS. 1 to 3.

In a further embodiment, the transfer board 1 may incorporate a seat 10, as shown in FIG. 4. FIG. 4 shows both a plan view of the seat 10, a side view of the seat 10 and an end view of the seat 10. The seat 10 incorporates a pair of side portions 11 that engage with the transfer board 1. The seat 10 may also comprise a centre portion 13 that provides a small depression within the surface. This centre portion 13 helps the person to locate into the correct position on the seat 10 to ensure a smooth and effective transfer process, without the transfer board 1 tipping forwards or backwards. The centre portion 13 helps to keep the centre of gravity of the person in the correct position when engaged with the transfer board 1. The seat 10 may also comprise curved ends 14 that match the curved ends 9 of the transfer board 1. The seat 10 may be made from plastics materials, such as HDPE or polyoxymethylene. The uppermost surface of the seat 10, upon which the patient is seated, may incorporate a coating to facilitate grip. This surface may incorporate In-Mould Labelling IML with a substance such as polyurethane to provide this grip, preventing slip of the person whilst sat on the seat 10, during the transfer process. The seat 10 may also comprise fabric material and/or rubber.

The uppermost surface Z of the seat 10 may be configured to provide sufficient grip for a user, so that the user does not slip about when sat on the seat 10. However, the underside surface W of the seat 10 may be coated, laminated or treated to provide a slippery surface, as friction free as possible, so that the seat 10 slides easily along the transfer board 1.

Figure 5:
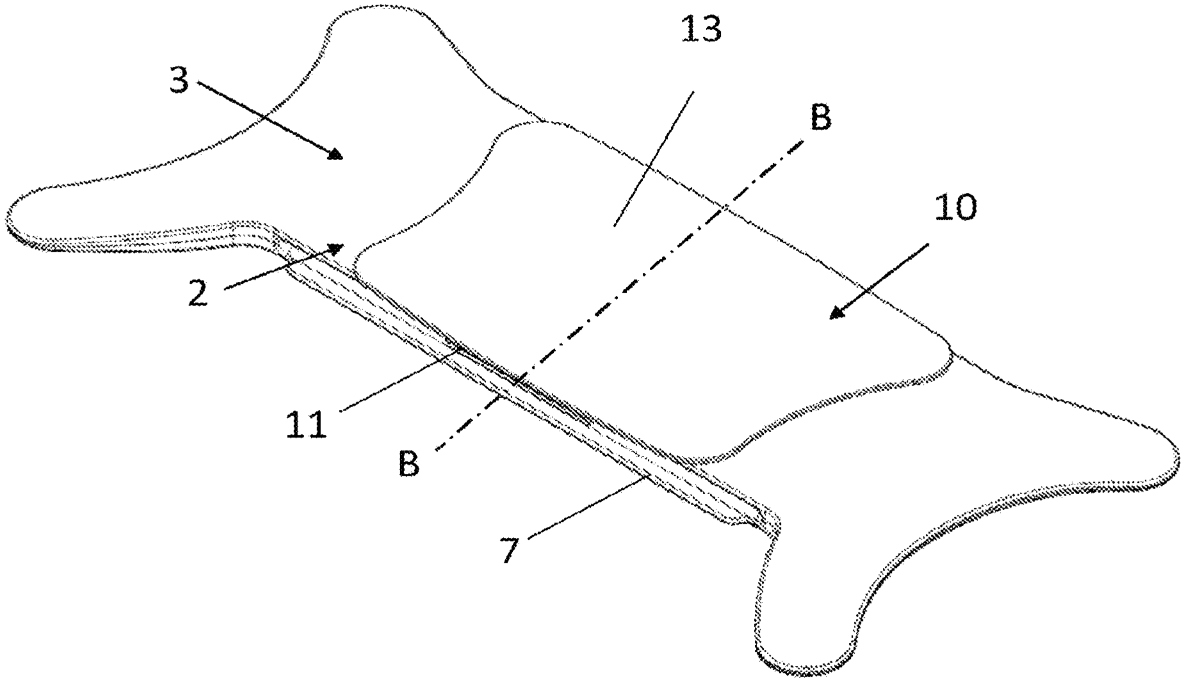
FIG. 5 shows, in isometric view, the seat of FIG. 4 engaged with the transfer board of FIGS. 1 to 3.
Figure 6:
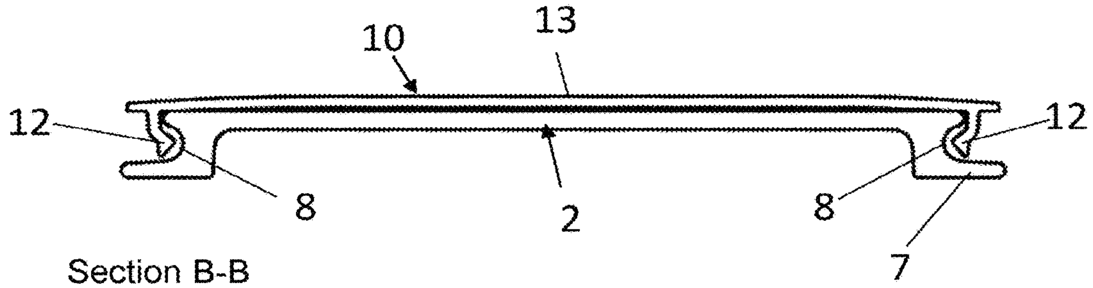
FIG. 6 is a section view B:B through the board and seat of FIG. 5.

As shown in FIGS. 5 and 6, the seat 10 is clipped or snapped onto the transfer board 1, the side portions 11 affording respective protrusions or ribs 12 that sit within the grooves 8 on either side of the main body portion 2. The engagement of seat 10 to grooves 8 can be clearly seen in FIG. 6. This arrangement of seat 10 means that it can be easily removed for cleaning purposes, or to suit different user requirements. It also helps to prevent skin, body parts, hair, clothing of the person from becoming trapped in any mechanisms. The seat 10 is slidably mounted so that it slides from one end portion 3 to the other end portion 3 of the transfer board 1. The interface between seat 10 and main body portion 2 is configured to be as friction free as possible, so that the seat 10 slides smoothly from one end to the other. The seat 10 can also be removed and the transfer board 1 still useable without it.

The skirt 7 serves to hold down any loose materials that may be underneath the transfer board 1 and thereby keep such materials from interfering with the ribs 12 and grooves 8 and thus the sliding movement of the seat 10 along the main body portion 2.

In an alternative arrangement, the side portions 11 of the seat 10 may afford grooves and the side portions of the main body portion 2 may afford ribs that engage the grooves of the side portions 11. In yet a further arrangement, the seat 10 may be configured to extend over the sides of the transfer board 1, making insertion beneath a user's buttocks easier. The seat 10 may also comprise a fabric end portion, again for ease of insertion. Such a fabric end portion may be in the form of a fabric 'skirt' that can be tucked under a user's bottom and is easier to insert than solid ends of the seat and/or board. The user may then be pushed over onto the board and the seat would move as usual. The side portions 11 of the seat 10 may comprise alternative shapes and dimensions to those shown in the figures.

Figure 7:
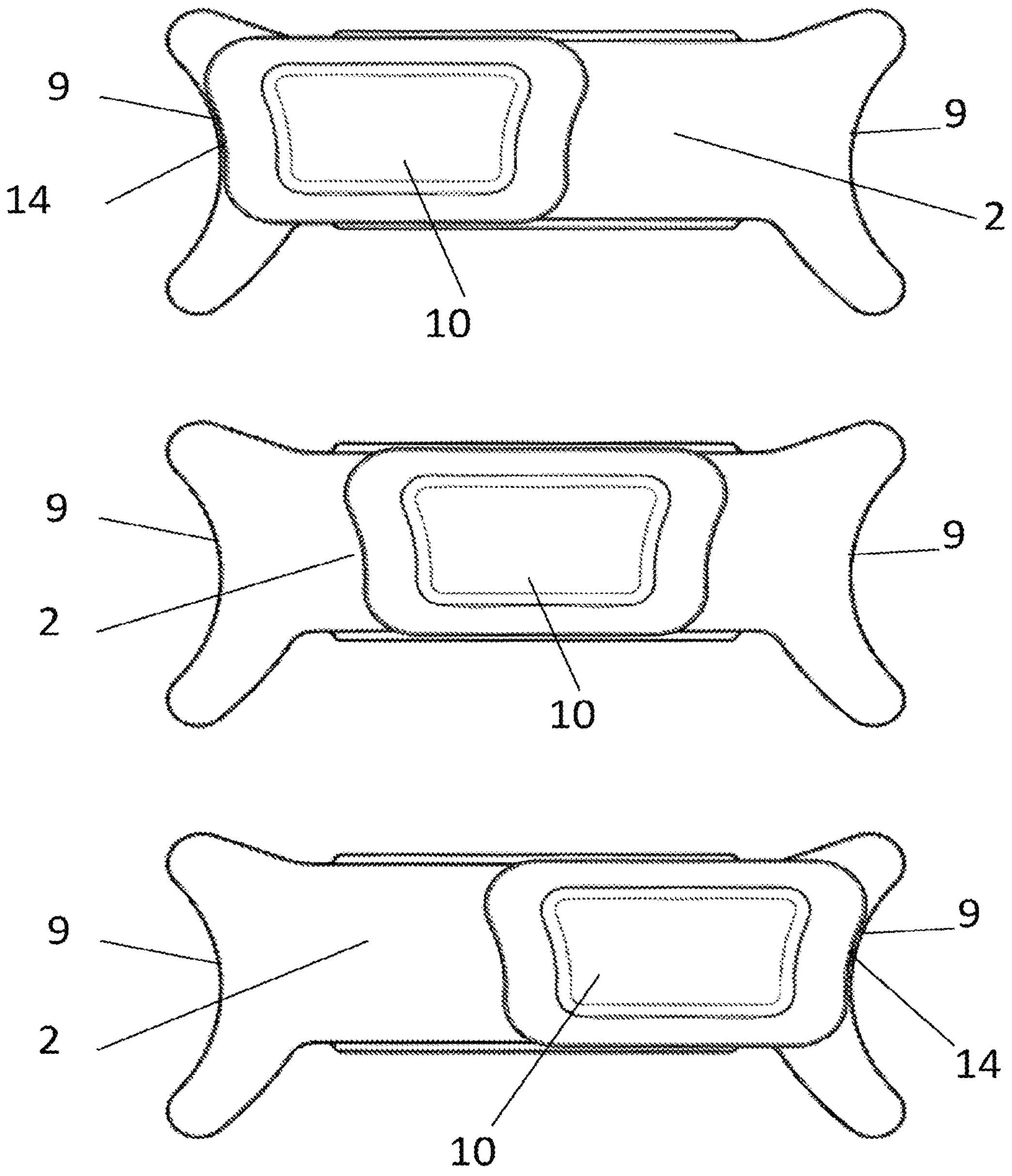
FIG. 7 shows, in plan view, the transfer board with seat of FIGS. 5 and 6, showing a series of seat positions along the board when moving from one surface to another.

FIG. 7 shows the seat 10 in three positions on the transfer board 1. In the first position, the seat 10 is at one end portion 3, and the curved ends 14 of the seat are shown to match the curved ends 9 of the body. The seat 10 freely slides along the main body portion 2, and the next image shows the seat in a central position, half way through the transfer process. The last image shows the seat at the other end portion 3, again with the curved ends 14 of the seat matching the curved ends 9 of the body when it has reached the end of travel. The matching curvature of the seat 10 and main body portion 2 help with the patient easing themselves onto and off the transfer board 1, whilst also preventing tip. By having a seat 10 that snaps onto the main body portion 2, the transfer board 1 can be as thin as possible, without bulky mechanisms. The seat 10 can be easily removed to be cleaned or sterilised between uses or when required. There are no grooves or protrusions within the top surface of the transfer board 1 itself, where dirt can easily become trapped, and provide a breeding spot for bacteria. The surface of the transfer board 1 can be easily wiped cleaned when required. Likewise, the seat 10 does not have any grooves or protrusions within its top surface, where dirt and other detritus can be easily trapped. making the transfer board 1 with seat 10 very easy to clean and sterilise.

The seat 10 could have an alternative configuration in which its ends extend further than the end portions 3, thereby to provide an extended transfer surface from the transfer board 1 to the intended target surface, when the seat 10 is in an end position on the main body portion 2.

To facilitate an easy glide of a patient when sat on the seat 10 and being transferred from one end of the transfer board 1 to the other, further elements may be incorporated, not shown in the figures. The underside W of the seat 10 may be provided with a strip of substantially friction-free material, such as HDPE or fabric. Likewise, the uppermost surface X of the transfer board 1 may be provided with at least one strip of the same substantially friction-free material. The strips may be replaceable, whereby when they become worn or lose their slip, they can be easily replaced. The underside W of the seat 10 and/or the uppermost surface X of the transfer board 1 may be provided with at least one replaceable strip portion.

Alternatively, the underside W of the seat 10 may comprise one or more rollers, not shown. The one or more rollers would be configured to assist the seat 10 with gliding across the surface of the transfer board 1.

Figure 8:
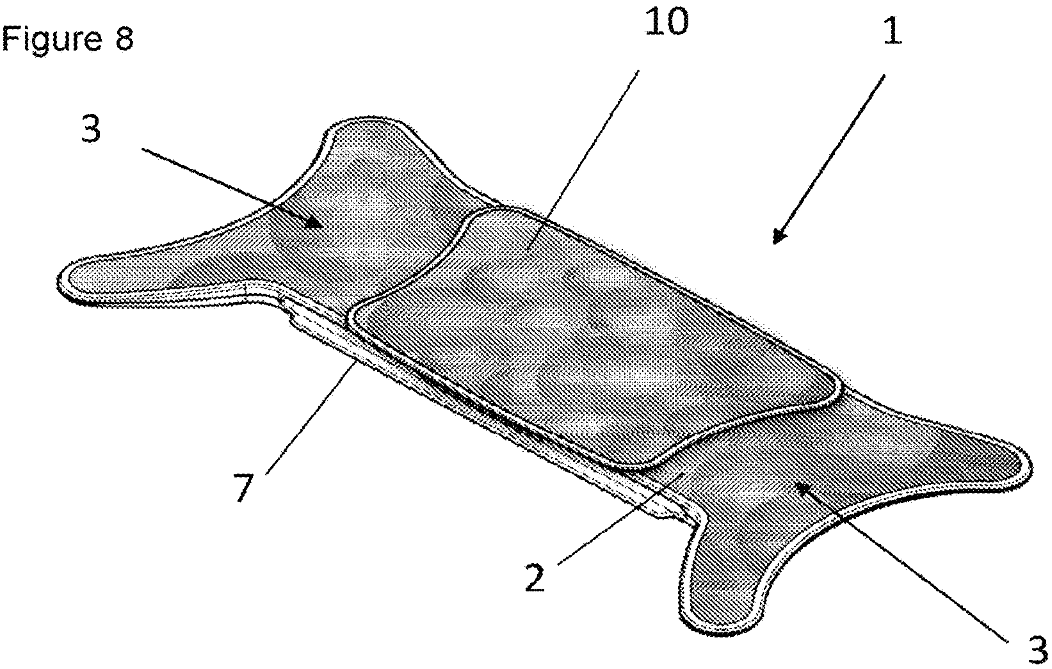
FIG. 8 is a view similar to FIG. 5, but showing one design of In-mould Label on the uppermost surfaces of both transfer board and seat.

FIG. 8 shows one embodiment of In-Mould Label within the uppermost surface Z of the seat 10 and uppermost surface of the main body portion 2. The In-Mould Labels moulded within those uppermost surfaces do not interfere with the transfer process, but provide an attractive aesthetic for a user.

By way of further explanation, an In-Mould Label (IML) is typically formed by way of a film with graphics that is placed robotically into a plastics moulding tool before plastics is injected into the tool. This creates an image that lies underneath a plastics coating that forms the upper surface of seat 10 and/or main body portion 2. This process allows a choice of different surface finishes—for example, low friction or high friction as discussed above. The plastics coating prevents the image from becoming prematurely worn.

Transfer boards traditionally have a very functional appearance. Moulding a decorative graphic into the seat 10 and/or main body portion 2 turns the transfer board 1 into a much more attractive and decorative item. This can provide a psychological boost for transfer board users who, by definition, have a hard time moving around. In addition to providing decorative graphics, a plastics coated label may also provide important information—for example, to identify the owner of the transfer board, so that it may be returned if lost; instructions on how to use the transfer board; and/or markings to show where to sit on seat 10.

Graphics may be provided on any one or more of the main body portion 2, the end portions 3 and the seat 10.

In addition to providing a choice of surface finishes, such as high gloss, matt, high friction, low friction, the surface coating on the main body portion 2 and/or seat 10 may have antimicrobial properties.

Figure 9:
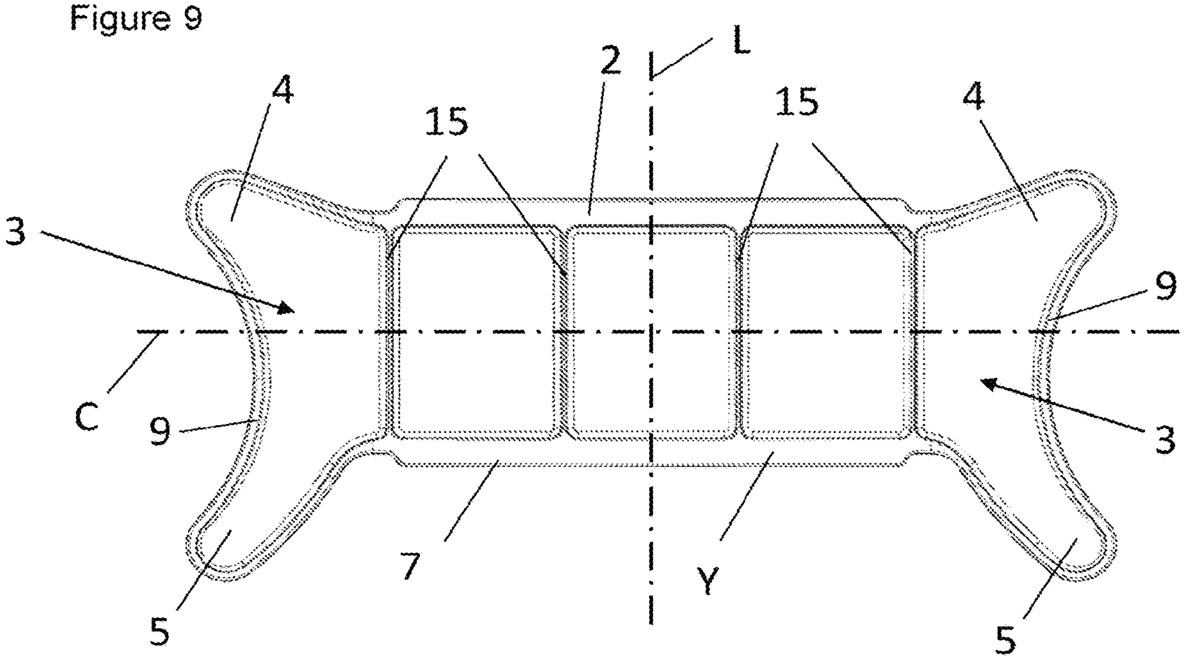
FIG. 9 is an underside plan view of a transfer board showing a plurality of ribs and longitudinal and transverse centre lines.

FIG. 9 shows an underside view of one arrangement of main body portion 2 of the transfer board 1, showing a plurality of ribs 15 formed within the underside surface Y. These ribs help to strengthen the main body portion 2 of the transfer board 1, preventing it from flexing when subjected to a load. Whilst a solid transfer board 1 of a suitable thickness would prevent flex, it would also add weight. By adding ribs 15, this arrangement of transfer board 1 allows for a thinner body portion 2, and therefore a lighter overall weight. Whilst having more ribs 15 would provide a stiffer transfer board 1, it may be less easy to clean. Therefore, there is a trade-off between the number of ribs 15 incorporated within the underside of the transfer board 1. FIG. 9 shows an arrangement of four ribs 15 within the underside surface 15 of the transfer board 1.

FIG. 9 shows a longitudinal centre line C of the main body portion 2 and a transverse centre line L. The asymmetrical arrangement of the fingers 4, 5 about the centre line C has a number of advantages.

Firstly, they may serve as handles, enabling a user to readily get hold of the transfer board 1. Secondly, as the fingers 4, 5 are of different configurations, they may enable the transfer board 1 to be used in differing physical situations. For example, the transfer board 1 may be used to transfer between fixed chair, wheelchair, bed, toilet, car and so on. All of these transfer points may have different configurations, to which the fingers 4, 5 of different configurations may be adapted.

The curved ends 9 can help a user to get hold of the respective end of the transfer board 1, in order to manoeuvre it into position, as the user does not need to reach the longitudinal extremities of the board 1—which extremities are the ends of the fingers 4, 5.

As indicated above, the transfer board 1 may be made of various materials. Many prior proposals aim to provide a rigid transfer board. As indicated above, it is preferred that the main body portion 2 does not provide significant flexing. However, by contrast, it is helpful if fingers 4, 5 have a certain amount of individual resilience and flexibility. This enables the fingers 4, 5 to adapt individually to the contours of a transfer surface, which may often be uneven. If both the main body portion 2 and the end portions 3 of the transfer board 1 were relatively inflexible, then the whole transfer board 1 would tend to tip, if any one part of it would tend to tip.

To afford such resilience and flexibility, it may be helpful if the transfer board 1 is constructed from a plastics material.

By way of example, the ends of the protrusions or fingers 4,5 may flex upwardly and/or downwardly by a distance in the range 0.5 to 5 cm, relative to a plane that includes the upper surface X of the main body portion 2 of the transfer board 1. A lower value of the range of flexure may be 0.5, 1, 1.5 or 2 cm. An upper value of the range of flexure may be 2.5, 3, 3.5, 4, 4.5 or 5 cm. A preferred range of flexure may be 1 to 4 cm.

In order to achieve the desired resilient flexibility of the protrusions or fingers 4,5, the stiffness of the protrusions 4, 5 is less than the stiffness of the main body portion 2. For example, the stiffness of each protrusion 4, 5 may be S % of the stiffness of the main body portion 2, where S=90, 80, 70, 60, 50, 40 or 30—preferably in the range 80% to 40%.

In FIG. 9, the transfer board 1 is symmetrical about the transverse centre line L. However, the fingers 4, 5 could be configured such that the transfer board 1 is asymmetrical about the transverse centre line L.

Whilst transfer boards 1 as illustrated and described above have two shorter and wider protrusions 4 and two longer and thinner protrusions 5, there may be provided more than two such protrusions 4 and/or 5. In particular, there may be provided three or four longer and thinner protrusions 5, with a view to enhancing stability further.

Transfer boards 1 along the lines of those illustrated and described above may have different relative dimensions. For example, the main body portion 2 may be longer in a transfer board 1 that is intended for transfer into and out of vehicles.

Whilst the illustrated and above-described transfer boards 1 are substantially rectilinear, the main body portion 2 could be curved, such that the centre line C is also curved.

In this specification, the verb "comprise" has its normal dictionary meaning, to denote non-exclusive inclusion. That is, use of the word "comprise" (or any of its derivatives) to include one feature or more, does not exclude the possibility of also including further features. The word "preferable" (or any of its derivatives) indicates one feature or more that is preferred but not essential.

The reader's attention is directed to all and any priority documents identified in connection with this application and to all and any papers and documents which are filed concurrently with or previous to this specification in connection with this application and which are open to public inspection with this specification, and the contents of all such papers and documents are incorporated herein by reference.

All or any of the features disclosed in this specification (including any accompanying claims, abstract and drawings), and/or all or any of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

That which is claimed is:

1. A method comprising:

transferring a person longitudinally from a first surface to a second surface by operating a transfer board having an elongate main body portion, a seat that is mounted on the main body portion for gliding movement over the main body portion, the seat having (i) side portions that engage respective side portions of the main body portion with interengaging ribs and grooves to retain the seat on the main body portion and (ii) rollers on an underside of the seat to afford said gliding movement over the main body portion.

2. The method of claim 1, wherein:

the respective grooves of the interengaging ribs and grooves are formed in the respective side portions of the main body portion and extend longitudinally along the main body portion;

the respective ribs of the interengaging ribs and grooves extend downwardly from the seat on opposed sides of the seat and engage with the respective groove on the same side of the main body portion; and the seat is removeable from the main body portion by laterally disengaging the ribs and grooves.

3. The method of claim 1, wherein the seat has a longitudinal width from a first longitudinal edge thereof to a second longitudinal edge thereof and a longitudinal width of the respective ribs is less than the longitudinal width of the seat.

4. The method of claim 1, wherein the main body portion includes a skirt at or adjacent an underside of the main body portion that extends outwardly at each side of the main body portion and extends along the main body portion for flattening loose material on the first surface and/or the second surface.

5. The method of claim 1, wherein the main body portion has a first terminal end on the first surface and a second terminal end on the second surface and respective opposing edges of the first terminal end and the second terminal end are tapered.

6. The method of claim 1, wherein the main body portion has a low friction coating on an upper surface thereof.

7. The method of claim 1, wherein the seat has a high friction coating on an upper surface thereof.

8. The method of claim 1, wherein the seat has a low friction coating on a lower surface thereof.

9. The method of claim 1, wherein the main body portion includes a plurality of reinforcing ribs on an underside thereof.

10. The method of claim 1, wherein at least one of the main body portion and seat is provided with a coating with antimicrobial properties.

11. A method comprising:

transferring a person longitudinally from a first surface to a second surface by operating a transfer board having an elongate main body portion, a seat that is mounted on the main body portion for gliding movement over the main body portion, the seat having (i) side portions that engage respective side portions of the main body portion with interengaging ribs and grooves to retain the seat on the main body portion and afford said gliding movement over the main body portion; and wherein the seat is removeable from the main body portion by laterally disengaging the interengaging ribs and grooves.

12. The method of claim 11, wherein the seat includes rollers on an underside of the seat to afford said gliding movement over the main body portion.

13. The method of claim 11, wherein:

the respective grooves of the interengaging ribs and grooves are formed in the respective side portions of the main body portion and extend longitudinally along the main body portion; and the respective ribs of the interengaging ribs and grooves extend downwardly from the seat on opposed sides of the seat and engage with the respective groove on the same side of the main body portion.

14. The method of claim 11, wherein the seat has a longitudinal width from a first longitudinal edge thereof to a second longitudinal edge thereof and a longitudinal width of the respective ribs is less than the longitudinal width of the seat.

15. The method of claim 11, wherein the main body portion includes a skirt at or adjacent an underside of the main body portion that extends outwardly at each side of the main body portion and extends along the main body portion for flattening loose material on the first surface and/or the second surface.

16. The method of claim 11, wherein the main body portion has a first terminal end on the first surface and a second terminal end on the second surface and respective opposing edges of the first terminal end and the second terminal end are tapered.

17. The method of claim 11, wherein the main body portion has a low friction coating on an upper surface thereof.

18. The method of claim 11, wherein the seat has a high friction coating on an upper surface thereof.

19. The method of claim 11, wherein the seat has a low friction coating on a lower surface thereof.

20. The method of claim 11, wherein the main body portion includes a plurality of reinforcing ribs on an underside thereof.

* * * * *